United States Patent [19]

Chenot

[11] 4,018,698
[45] Apr. 19, 1977

[54] CERIUM STABILIZED MAGNESIUM ALUMINUM GALLATE PHOSPHORS

[75] Inventor: Charles F. Chenot, Towanda, Pa.

[73] Assignee: GTE Sylvania Incorporated, Stamford, Conn.

[22] Filed: Jan. 29, 1975

[21] Appl. No.: 545,171

Related U.S. Application Data

[63] Continuation-in-part of Ser. No. 458,077, April 5, 1974, abandoned.

[52] U.S. Cl. .................... 252/301.4 R; 313/486; 313/488
[51] Int. Cl.² .................................. C09K 11/46
[58] Field of Search ............ 252/301.4 R; 313/486, 313/488

[56] References Cited

UNITED STATES PATENTS

| | | | |
|---|---|---|---|
| 3,407,325 | 10/1968 | Brown | 252/301.4 X |
| 3,635,833 | 1/1972 | Datta | 252/301.4 R |
| 3,693,006 | 9/1972 | Chenot | 313/486 |
| 3,723,339 | 3/1973 | Wanmaker et al. | 252/301.4 R X |
| 3,838,060 | 9/1972 | Kaduk | 252/301.4 P |

OTHER PUBLICATIONS

Brown, II, "J. Electrochem. Soc.," vol. 114, No. 3, 1967, pp. 245–250.

*Primary Examiner*—Jack Cooper
*Attorney, Agent, or Firm*—Norman J. O'Malley; Donald R. Castle; John C. Fox

[57] ABSTRACT

Improved fluorescent efficiency is achieved by a luminescent composition consisting essentially of from about 99.97% to about 99.995% by weight of a manganese-activated magnesium aluminum gallate phosphor having the formula:

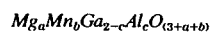

$$Mg_aMn_bGa_{2-c}Al_cO_{(3+a+b)}$$

wherein a + b is from about 0.85 to about 1.05, b is from about 0.001 to about 0.06, c is from about 0.01 to about 1.2 and as a stabilizer from about 0.005% to about 0.03% by weight of cerium. The lamps employing such luminescent compositions have improved fluorescent efficiency, lamp life and lamp operating maintenance as compared to materials without the cerium stabilizer.

2 Claims, 2 Drawing Figures

CERIUM STABILIZED MAGNESIUM ALUMINUM GALLATE PHOSPHORS

CROSS REFERENCE TO RELATED APPLICATION

This application is a continuation-in-part of U.S. Pat. Application Ser. No. 458,077, filed Apr. 5, 1974, now abandoned.

BACKGROUND OF THE INVENTION

1. Field of the Invention

This invention relates to luminescent compositions. More particularly, it relates to improved manganese-activated magnesium aluminum gallate phosphors.

2. Prior Art

Manganese activated magnesium aluminum gallate phosphors are known and are disclosed in U.S. Pat. No. 3,499,843. These phosphors when excited by 253.7 nm ultraviolet radiation are particularly applicable to electrophotographic reproduction techniques. Such phosphors emit narrow bands of visible green light. While these phosphors were satisfactory for a number of years, as methods of electrophotographic reproduction are improving new demands are being placed upon the phosphor lamp combination. This has required changes in the emission peak position, improvements in phosphors lamp brightness, increases in phosphor lamp temperature dependence stability and improvements in overall phosphor lamp processes and maintenance stability. A common phenomena observed among fluorescent lamp phosphors is the tendency for luminescent materials to degrade during the lamp manufacturing process. It is believed that this degradation is associated with the rather severe chemical activity to which the phosphor is exposed during the lehring phases of lamp manufacturing. Another associated form of degradation is generally referred to herein as maintenance degradation which is initially rapid but gradually dimensioning degradation of the lamp luminescent output as a function of lamp operating time. This maintenance degradation is generally associated with the chemical changes that have probably occurred during the time the lamp is in operation. Some experimentation has suggested a correlation between these two degradations tendencies and, thus, some interdependence between the process degradation and maintenance degradation is believed to exist. The magnesium gallate phosphors are not exception to the foregoing degradation tendencies. While some improvement has been achieved by a less severe firing procedure than is taught in the originally cited patent by a fluoride hydrolysis reaction mechanism as disclosed and taught in my co-pending patent application Ser. No. 329,651, filed Feb. 5, 1973, now U.S. Pat. No. 3,962,118 the phosphor still exhibits some degradation. It is believed, therefore, that a phosphor of the magnesium gallate type which would exhibit improved fluorescent efficiency and achieve longer lamp life and improved lamp operating maintenance would be an advancement in the art.

OBJECTS AND SUMMARY OF THE INVENTION

It is an object of this invention to provide an improved manganese-activated magnesium aluminum gallate phosphor.

It is an additional object of this invention to provide improved lamps employing improved manganese-activated magnesium aluminum gallate phosphor.

These and other objects of the invention are achieved in one aspect of this invention by a luminescent composition consisting essentially of from about 99.97% to about 99.995% by weight of a manganese-activated magnesium aluminum gallate phosphor having the formula:

$$Mg_a Mn_b Ga_{2-c} Al_c O_{(3+a+b)}$$

wherein $a + b$ is from about 0.85 to about 1.05, $b$ is from about 0.001 to about 0.05 and $c$ is from about 0.01 to about 1.2 and from about 0.005% to about 0.03% by weight of cerium as a stabilizer.

In another aspect of the invention, an improved lamp employing such phosphors in which the lamp contains a coating of the foregoing cerium-stabilized, manganese-activated aluminum magnesium gallate phosphor over from about 270° to about 340° the circumference of the tube and thus has an aperture of from about 20° to about 90° free of the foregoing phosphor coating to allow light from the phosphor to immerge therethrough.

In accordance with an additional aspect of this invention there is provided an improvement to the process for producing the phosphors. The improvement comprises forming a uniform admixture of a suitable cerium source in proper amounts and the phosphor raw materials prior to the initial firing at 1200° to 1300° C, followed by a second firing under controlled conditions to produce proper size particles while avoiding excessive loss of gallium.

DESCRIPTION OF THE EMBODIMENTS

For a better understanding of the present invention, together with other and further objects, advantages and capabilities thereof, reference is made to the following disclosure and appended claims in connection with the above-described drawing.

In accordance with this invention, it has been discovered when cerium is in the synthesis of the manganese-activated magnesium aluminum gallate phosphor, the phosphor is stabilized and thus prevents degradation, both in the process and in lamp operation. It is believed that the trivalent cerium ion acts as a charge buffering dopant up to about the 300 ppm level. Concentrations of cerium in the order of about 50 parts per million to about 150 parts per million by weight are preferred as being effective in stabilizing the magnesium aluminum gallate phosphors. It is to be noted, however, that a closely associated phosphor which is manganese-activated gallate phosphor is not stabilized by cerium addition. Copending patent application Ser. No. 458,078, filed Apr. 5, 1974 discloses a stabilizer for such phosphors. Phosphorus has been found to be effective in this application. Mixtures of the cerium-stabilized manganese-activated magnesium aluminum gallate phosphors of this invention and the phosphorus-stabilized manganese-activate magnesium gallate phosphors of the foregoing copending application are effective as electrophotographic lamp phosphors.

Figure 1:
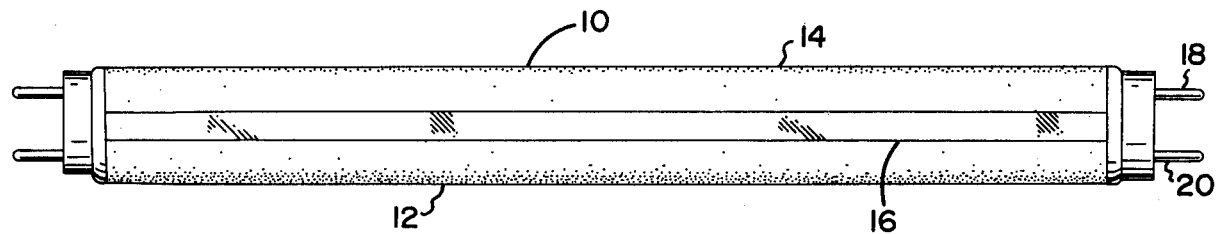
FIG. 1 is a perspective view of an aperture type fluorescent lamp using the cerium-stabilized manganese-activated aluminum magnesium gallate phosphor of this invention.

Referring now in detail to FIG. 1, the lamp 10 has a seal, hollow glass tube 12 containing a fill of 85% argon and 15% helium (although other suitable ionizable gas fillings may be used). On the inside surface of glass envelope there is a coating 14 of the magnesium aluminum gallate phosphor material of this invention. The phosphor coating 14 is shown in this embodiment to extend around 315° of the circumference of the tube; the other 45°, aperture 16 of the tube, is left free of phosphor coating to allow light from the phosphor to emerge therethrough. Although this embodiment shows the foregoing width of the aperture, the actual width of the aperture in practical applications is determined by the amount of light which is desired. Thus, sizes other than the 45° as shown in this embodiment can be utilized and can vary between 20° and 90°. The brightness in the aperture area increases as the aperture width is reduced.

At the end of the glass tube 12 there is electrode comprising an oxide coated tungsten foil, two auxiliary anodes and associated lead wires as shown for example in U.S. Pat. No. 2,761,566. An insulative plastic base with base carrying contacts 18 and 20 is illustrative in the Figure as well as in U.S. Pat. No. 2,896,187.

The phosphor coating can be applied over the entire glass envelope, for example, by means well known in the art and then scraped and brushed off to achieve the desired aperture 16 of the glass tube 12 as desired.

These materials can be synthesized by the general techniques disclosed in U.S. Pat. No. 3,499,843 or by the techniques disclosed in the before-mentioned copending application Ser. No. 329,651, except that the appropriate amount of cerium is introduced at the time of synthesis. To further illustrate the invention the following detailed example is presented. All parts, percentages and proportions are by weight unless otherwise specified.

EXAMPLE I

A blend of the following ingredients is prepared by ball milling:

|  | Molar Relationship | Weight Relationship |
|---|---|---|
| MgO | 0.450 | 3.63 |
| MgF$_2$ | 0.500 | 6.23 |
| Ga$_2$O$_3$ | .75 | 28.1 |
| Al(OH)$_3$ | .50 | 7.8 |
| MnCO$_3$ | 0.010 | 0.230 |
| CeF$_3$ | 0.0001 | 0.00394 |

The blended materials are heat treated for about 2 hours in humid air in alumina crucibles at temperatures of between 1200° and 1300° C. After this heat treatment, the material is ground and placed in silica crucibles at temperatures of from about 1200° to 1300° C for less than 60 minutes in a mildly reducing atmosphere containing a small amount of hydrogen, (generally less than 1% by volume is used) in nitrogen. Excess hydrogen results in an over reduction and a loss of gallium. Following this second heat treatment step, the material is cooled to room temperature and heated above 1280° C in the same type of atmosphere as in the second heating step for about 90 minutes. The resulting phosphor is a finely divided powder and exhibits an emission peak at about 507 nm and a one-half peak height band width of about 32.5 nm.

Although cerium fluoride is the preferred cerium source, other cerium sources can be used. Any cerium source which will form a cerium ion upon being heated to about 1200° C can be used. For example, cerium oxides, cerium halides, cerium hydroxide, cerium nitrates can be used. Cerium metal can be used provided it reacts with the other raw materials to form a cerium ion. The first firing step is not critical and the temperature can be held at 1200° to 1300° C for up to 6 hours without excessive particle size reduction. In the second and third firing steps, if used, the conditions of the firing are such that a semi-fluidized bed exists. The temperature control is more critical and is held between about 1260° and 1300° C. The particle size of the materials which have been found to give optimum results with lamps is from about 5 to 9 microns F.S.S.S.

Figure 2:
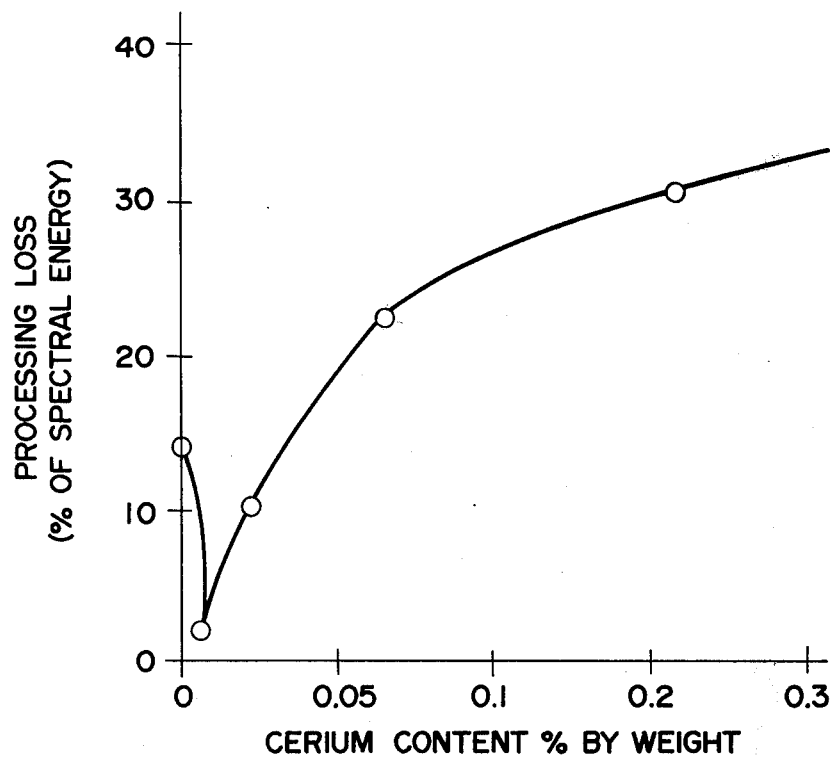
FIG. 2 is a graph showing the effect of cerium upon the degradation occurring during lamp lehring of manganese-activated aluminum magnesium gallate phosphor.

Referring in detail to FIG. 2, the graph shows the percent of the initial spectral energy which various phosphors lose during lamp "lehring". As explained earlier in this specification, the total loss is the amount lost during fabrication of the tube is also related to that lost after fabrication during its operating life. These results clearly indicate that cerium can dramatically decrease the spectral energy or brightness loss. For example, the phosphor prepared in the Example exhibits less than a 5% loss in spectral energy during the lehring whereas the phosphor without cerium has about 15% of its spectral energy loss during lehring. Beneficial effects of cerium are achieved up to a level of about 0.03% by weight of cerium in the phosphor.

While there has been shown and described what are at present considered the preferred embodiments of the invention, it will be obvious to those skilled in the art that various changes and modifications may be made therein without departing from the scope of the invention as defined by the appended claims.

What is claimed is:

1. A luminescent composition consisting essentially of from about 99.97% to about 99.995% by weight of a manganese-activated magnesium aluminum gallate phosphor having the formula:

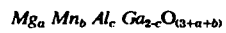

$$Mg_a\ Mn_b\ Al_c\ Ga_{2-c}O_{(3+a+b)}$$

wherein $a + b$ is from about 0.85 to about 1.05, $b$ is from about 0.001 to about 0.05 and $c$ is from about 0.01 to about 1.2 and from about 0.005% to about 0.03% by weight of trivalent cerium.

2. A composition according to claim 1 wherein the cerium content in said composition is from about 0.005% to about 0.015% by weight.

* * * * *